United States Patent [19]

Dreyer et al.

[11] 4,043,524

[45] Aug. 23, 1977

[54] SUPPORT AND LOAD ALLEVIATION SYSTEM FOR SPACE VEHICLES

[75] Inventors: Wesley M. Dreyer, Encinitas; Richard G. Huntington, San Diego, both of Calif.

[73] Assignee: General Dynamics Corporation, San Diego, Calif.

[21] Appl. No.: 716,418

[22] Filed: Aug. 23, 1976

[51] Int. Cl.² .............................................. B64D 9/00
[52] U.S. Cl. ................................ 244/118 R; 244/158; 206/3; 105/463; 220/4 B; 248/5
[58] Field of Search ............................ 244/158–161, 244/118 R, 137 R; 248/2, 3, 5; 206/3, 319; 220/4 B, 4 E; 89/1 SR, 1 SF, 1 SE; 105/463, 464, 466, 469, 471, 367; 214/77 R, 80, 501

[56] References Cited

U.S. PATENT DOCUMENTS

| 2,650,050 | 8/1953 | Chandler | 248/5 |
| 2,928,535 | 3/1960 | Simmons et al. | 206/319 |
| 3,164,342 | 1/1965 | Jacobsen | 248/3 |
| 3,465,871 | 9/1969 | Lyons et al. | 206/3 |
| 3,815,849 | 6/1974 | Meston | 244/158 |

FOREIGN PATENT DOCUMENTS

| 1,332,907 | 10/1973 | United Kingdom | 244/161 |

OTHER PUBLICATIONS

Cepollina et al., "In-Orbit Servicing", *Astronautics and Aeronautics*, Feb. 1975, pp. 51–56.

*Primary Examiner*—Trygve M. Blix
*Assistant Examiner*—Galen L. Barefoot
*Attorney, Agent, or Firm*—John R. Duncan

[57] ABSTRACT

A cradle for supporting a space vehicle such as an upper stage in a reusable launch vehicle (such as a space shuttle orbiter) cargo bay. The cradle includes means for supporting the space vehicle and any satellite attached thereto against launch loads and against abort landing loads. The cradle consists of two radial sections of a tube which, when closed, surrounds the space vehicle. One section is secured within the cargo bay. The second section is latched to the first edge of the second section and is hinged along the second edge. When the cargo bay doors are opened, the space vehicle is deployed by unlatching said latch and activating a first actuation means to rotate the second section about the hinge to move the second section outwardly of the cargo bay. A deployment probe connects the space vehicle to the second section. When the first section is fully rotated, a second actuation means rotates the deployment probe to move the space vehicle from the position in contact with the inner surface of the second section to an extended position extending away from the orbiter. The probe is then operated to release the space vehicle into space.

4 Claims, 14 Drawing Figures

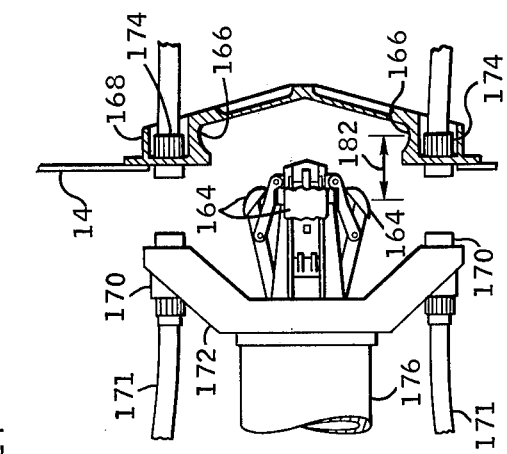
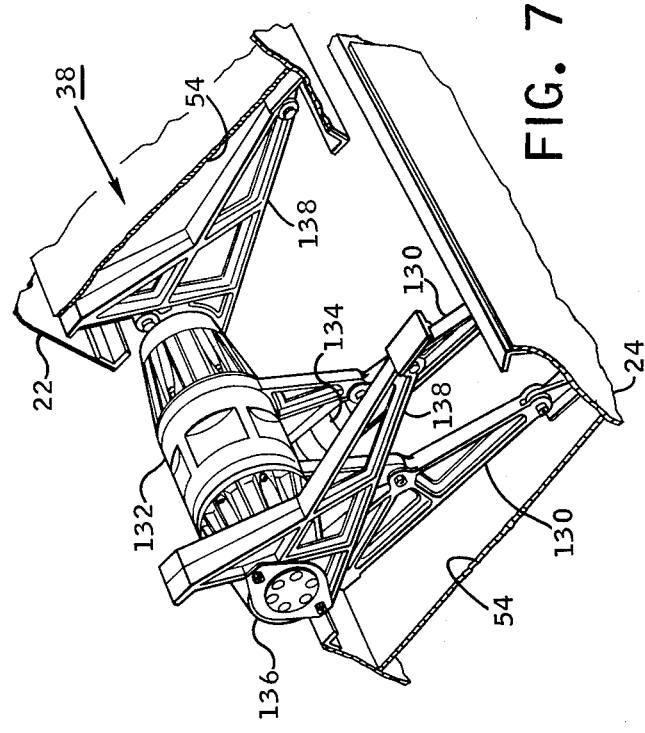
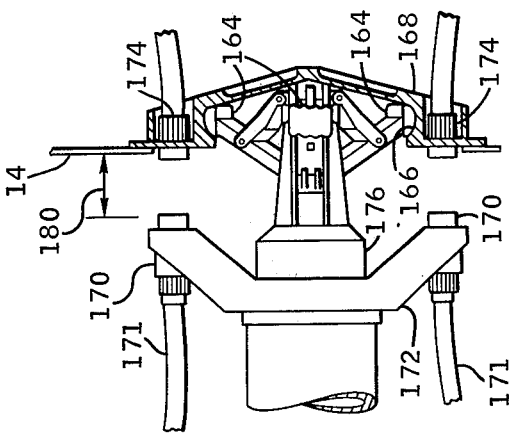
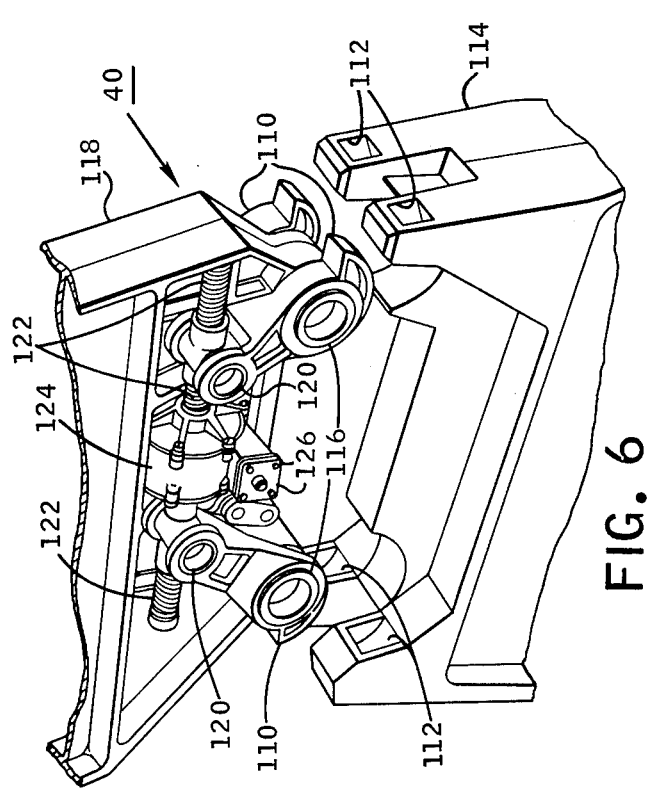
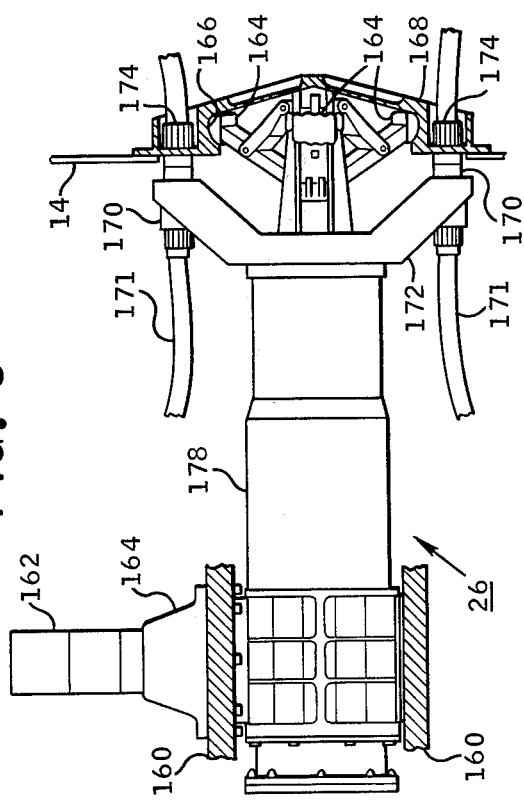

SUPPORT AND LOAD ALLEVIATION SYSTEM FOR SPACE VEHICLES

BACKGROUND OF THE INVENTION

This invention relates in general to the launching of space vehicles and, more specifically, the supporting of space vehicles, such as upper stages, within the cargo bay of a reusable launch vehicle and the deployment of the space vehicle from the launch vehicle in space.

The development of a reusable space launch vehicle, generally referred to as the "space shuttle" promises considerable savings in cost, time and efficiency over earlier expendable launch vehicles.

The space shuttle as presently envisioned is limited in orbital heights which can be reached. In order to place payloads in higher orbits, or to go beyond earth orbit, it is necessary that an upper stage, sometimes called the "space tug" be carried into initial orbit in the shuttle, then be deployed and used to carry a payload mounted on the upper stage to the desired location beyond the shuttle orbit. These payloads (such as communication satellites, scientific experimental devices, interplanetary spacecraft, etc.) and upper stages can be collectively termed "space vehicles".

The space vehicle must be supported in the shuttle cargo bay in a manner which will prevent damage to the payload by attenuating loads during shuttle liftoff and abort landings. Greater load attenuation permits lighter and more efficient upper stage and/or payload structures.

The space vehicle support system must be capable of rapidly and reliably deploying the space vehicle from the stored position within the cargo bay to a location away from the shuttle. Further, the deployment system should be capable of retrieving a space vehicle and returning it to the stored position. This system should optimally combine light weight, strength and reliability. Desirably, the capability of both ground and shuttle-based check-out of spacecraft systems while the spacecraft is extended away from, but physically connected to, the shuttle should be provided in the deployment system.

Many structures have been designed for carrying devices in aircraft, expendable launch vehicles, etc. Generally, these are not adaptable to space shuttle base use because of problems in excessive weight, lack of capability to attenuate launch or landing loads, low reliability, etc. Thus, there is a need for an improved spacecraft support and deployment system for use with the space shuttle orbiter.

OBJECTS OF THE INVENTION

An object, therefore, of this invention is to provide a support and deployment system overcoming the above-noted problems.

Another object of this invention is to provide a support and deployment system of increased reliability.

A further object of this invention is to provide a support and deployment system which highly attenuates launch and abort landing loads on a supported space vehicle.

Still another object of this invention is to provide a light weight clamping arrangement for securely holding a space vehicle in a support structure while permitting rapid deployment therefrom.

Yet another object of this invention is to provide a space vehicle deployment system which permits convenient electrical checkout of a spacecraft while extended from, but secured to, a reusable launch vehicle.

SUMMARY OF THE INVENTION

The above objects, and others, are accomplished in accordance with this invention, by a cradle-like structure for supporting a space vehicle (e.g., an upper stage and attached payload) in the cargo bay of a reusable space launch vehicle, such as a space shuttle orbiter, during launch and possible mission abort landings. The cradle, which is generally annular in shape and surrounds at least a portion of the length of the spacecraft, is made up of two radial sections, a first section secured to the interior of the cargo bay and a second section hingedly connected to the first section. The spacecraft is secured to the second section by a hinged probe. The spacecraft is carried with the second section as it is rotated away from the first section. Then, the probe is rotated to move the spacecraft from the inner surface of second section to a position extending away from the cradle sections and launch vehicle.

When the cradle is in the closed or flight position, the spacecraft is supported by the interaction between a pair of grooved rings on the inner surface of the cradle sections and a pair of meshing outwardly extending rings on the other cylindrical surface of the spacecraft. The meshing rings support the spacecraft against forces imposed during launch and abort landings and permit deployment without restriction. Best results are obtained with rings of a preferred configuration, as detailed below.

The first section of the cradle is mounted in the launch vehicle cargo bay in a six-point system which provides a very stiff support interface and lowest interface loads during launch. The system includes two aft attachments reacting ± X and ± Z loads, two bottom attachments reacting ± Y loads and two forward attachments reacting ± Z loads. The forward attachments further include liquid spring means to provide reduced landing stiffness in the event of a mission abort or where a spacecraft is being retrieved from space and returned to earth.

BRIEF DESCRIPTION OF THE DRAWING

Details of the invention, and of a preferred embodiment thereof, will be further understood upon reference to the drawing, wherein:

FIG. 6 is a detail perspective view of the latch means for securing together the first and second cradle sections;

FIG. 7 is a detail perspective view of the actuator means for rotating the second cradle section;

FIG. 10 a, b and c are plan views of the cradle to spacecraft deployment probe in three successive deployment positions.

DETAILED DESCRIPTION OF THE INVENTION

Figure 1:
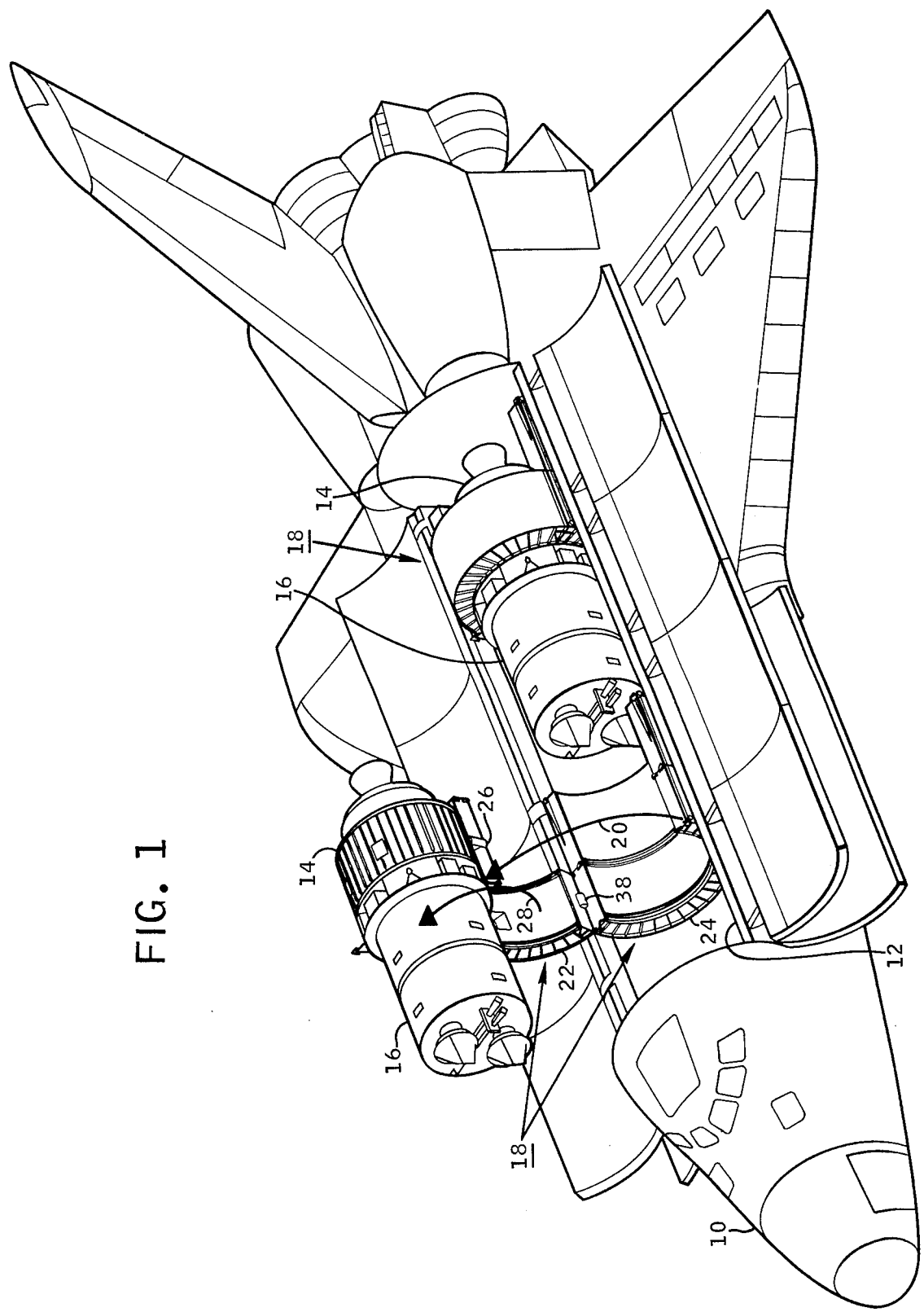
FIG. 1 is a perspective view of two of the support systems of this invention installed in the cargo bay of a space shuttle orbiter.

Referring now to FIG. 1, there is seen a schematic representation of a reusable space launch vehicle 10, ordinarily referred to as a "space shuttle". This vehicle is designed to be launched into earth orbit with the aid of an auxiliary fuel tank and auxiliary rockets, deploy a space vehicle from cargo bay 12 and/or retrieve and house an orbiting space vehicle in cargo bay 12, then return to earth.

For many purposes, it is necessary to place spacecraft in higher orbits, or beyond the earth's gravitational field. In that case, an upper stage 14 supporting a satellite 16 may be carried in cargo bay 12 and deployed in orbit. Upper stage 14 then will be operated to place the satellite in the desired higher orbit or elsewhere. Similarly, an upper stage can be used to retrieve a possibly malfunctioning satellite, and return it to cargo bay 12 for return to earth.

It is necessary that space vehicles, such as upper stages 14 and satellite 16 be supported within cargo bay 12 in a manner which prevents damages during launch or earth landings, and provides safe and reliable deployment of retrieval in space. In the embodiment shown in FIG. 1, two sets of upper stage and satellite are shown, supported by a two-section cradle-like support means 18. The forward cradle 18 is shown in the open, space vehicle deployment or retrieval position, while the aft cradle 18 is shown in the closed or flight position. As illustrated by arrow 20, deployment is initiated by rotating second cradle section 22 around a hinge away from first cradle section 24, then rotating upper stage 14 out of second section 22 by hinged probe 26, as indicated by arrow 28.

Figure 2:
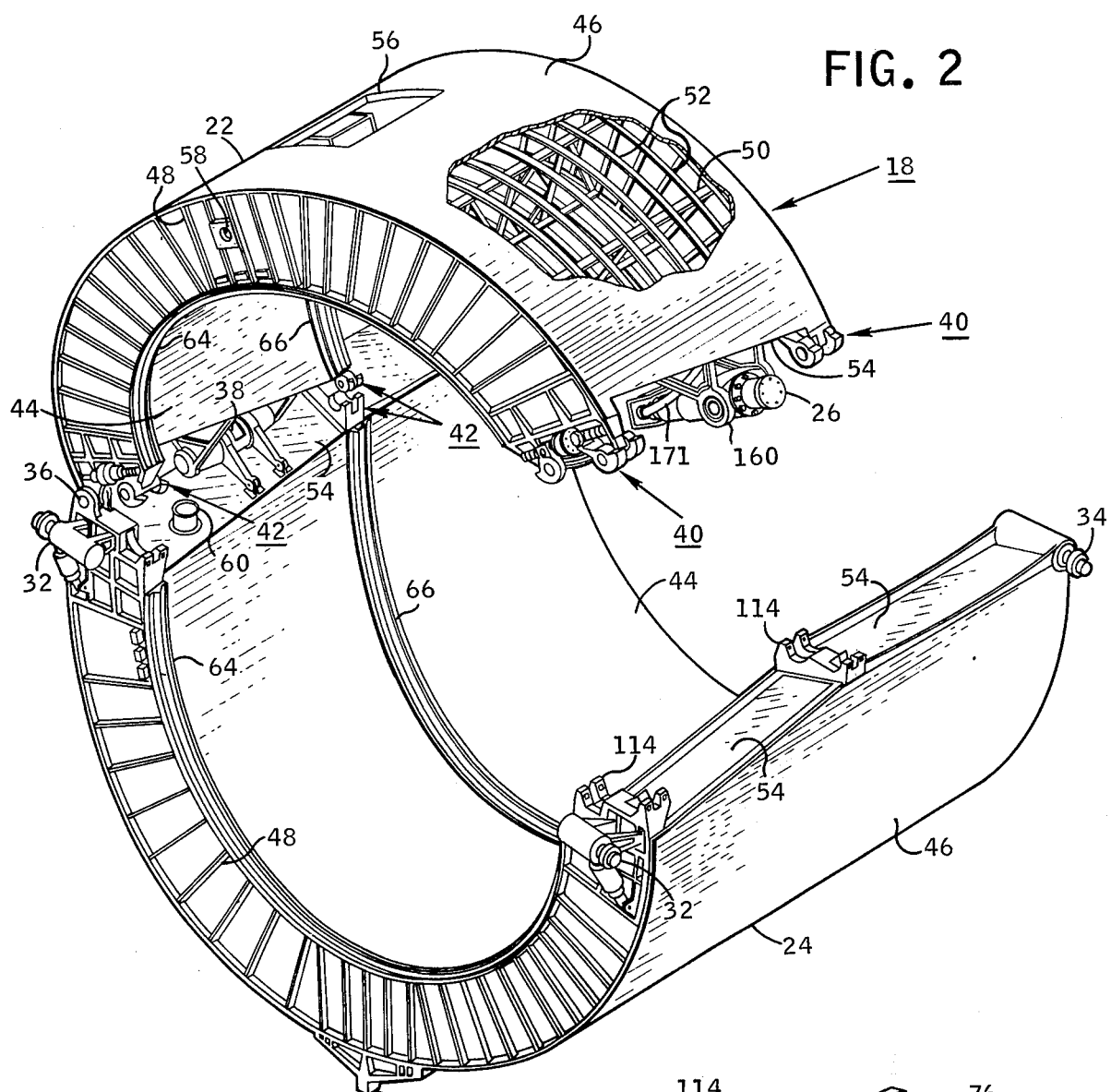
FIG. 2 is a perspective view, partially cut away, of the cradle assembly.

Further details of the preferred cradle 18 of this invention are shown in FIG. 2.

First cradle section 24 is adapted to attachment and support by the conventional space shuttle cargo bay fittings (not shown) through a pair of lateral support fittings 30, a pair of forward support fittings 32 (shown in greater detail in FIG. 4) and a pair of aft support fittings 34. The standard space shuttle orbiter cargo bay attachment fittings are described in a National Aeronautics and Space Administration publication entitled "Space Shuttle Systems Payload Accommodation" JSC07700, Volume XIV, available from the Johnson Space Center, Houston, Texas.

Second cradle section 22 is hingedly connected to first cradle section 24 for rotation relative thereto by a hinge 36 and rollout actuator 38 (shown in greater detail in FIG. 7).

The two cradle sections 22 and 24 are latched together during flight by a pair of first clamping latches 40 (shown in greater detail in FIG. 6) and a pair of second clamping latches 42.

The first and second cradle sections 24 and 22 are closed box structures consisting of inner skins 44, outer skins 46, integrally machined frames 48, longitudinal ribs 50, circumferential formers 52 and integrally machined closing beams 54. Suitable access openings 56 are provided where necessary. Provision for wiring (such as socket 58) and air conditioning ducts (such as duct 60) may be made as desired. As can be seen in the illustrated embodiment, first section 24 is longer than second section 22. When closed, the inner skins 44 and outer skins 46 form a generally cylindrical inner and outer surfaces. When closed, a generally wedge-shaped gap exists between closing beams 54, with the wide end of the gap forward, as indicated by the taller supports for the forward latches 40 and 42.

The closed cradle arrangement for supporting a space vehicle is preferred because of its excellent inherent stiffness, load distribution characteristics and independent positive deployment control capabilities. Internally stiffened cradle skins 44 and 46 provide smooth, easily cleaned inner and outer surfaces and help prevent external spacecraft or cargo bay liner damage.

Figure 8:
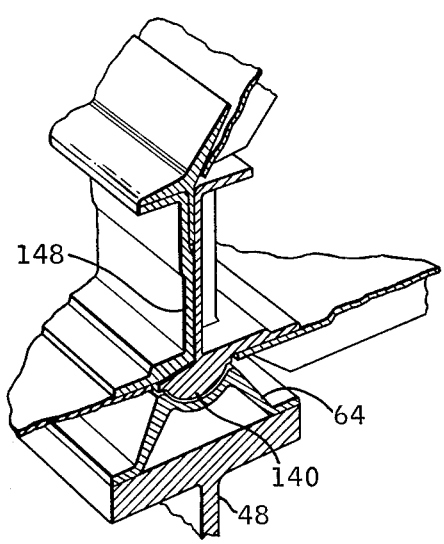
FIG. 8 is a detail perspective view, partly in section, of the forward spacecraft-to-cradle mount.
Figure 9:
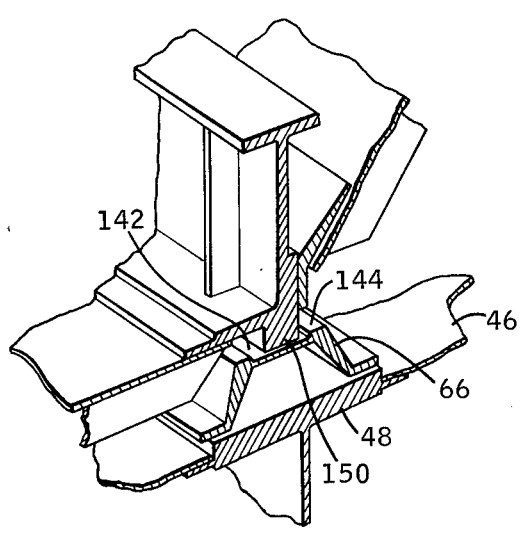
FIG. 9 is a detail perspective view, partly in section, of the aft spacecraft-to-cradle mount.

A space vehicle is supported within cradle 18 by a unique circumferential structural joint at two locations to react flight loads. This Continuous Integrated Normal Clamping Hoop (CINCH) concept includes two 140° forward ring sections 64 and two 140° aft ring sections 66 attached to first and second cradle sections 24 and 22. These ring section 64 and 66 mate with cooperatingly shaped continuous rings (not shown) around the spacecraft to be supported. Opposed 140° ring sections are provided, rather than longer sections, so that latch closing and uniform CINCH mount contact is assured despite slight manufacturing tolerances. Longer cradle ring sections 64 and 66 would not adapt as well to this slight required deformation. While sections shorter than 140° could be used, shorter sections give less support area and lower strength. Details of the CINCH mounts are shown in FIGS. 8 and 9, discussed below.

Figure 3:
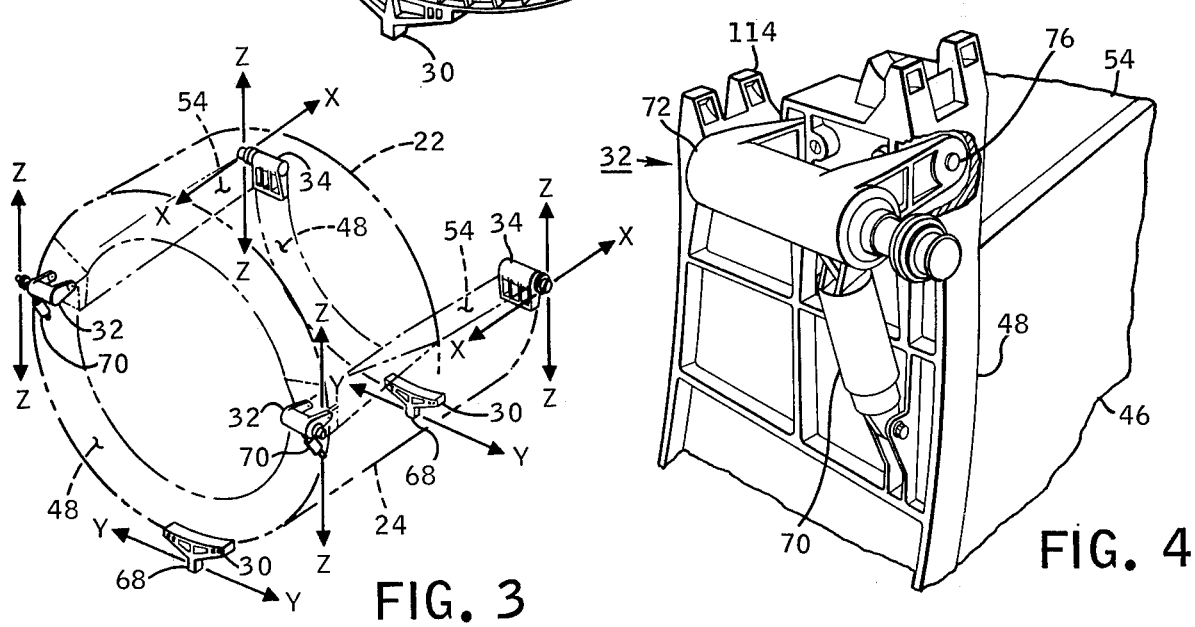
FIG. 3 is a schematic perspective view illustrating the cradle to cargo bay interface support means.

The novel cradle-to-orbiter structural support arrangement is schematically detailed in FIG. 3. The fittings in this six-point redundant system mate with standard orbiter cargo bay pickup fittings, four at the orbiter longeron bridge beams and two at keel bridge beams. This six-point retention system provides a very stiff interface and lowest interface loads. This system utilizes two lateral support fittings 30 along the cradle lower centerline to resist loads in the ± Y direction. This fitting has a downwardly extending tongue 68 which engages a standard orbiter fitting at the orbiter keel interface. Two forward support fittings 32 react vertical ± Z loads through a liquid spring 70. Fitting 32 is shown in detail in FIG. 4, while internal detail of liquid spring 70 is detailed in FIGS. 5 a, b and c. Fitting 32 may be located forward or aft of forward frame 48 to provide cradle mounting flexibility. A pair of aft support fittings 34 are hard-mounted at the intersection of aft cradle frame 48 and longitudinal closing beam 54. Fitting 34 transmits cradle-to-orbiter ± X and ± Y loads. Fittings 32 and 34 interface with standard orbiter longeron bridge beam fittings and ground equipment fittings.

Figure 4:
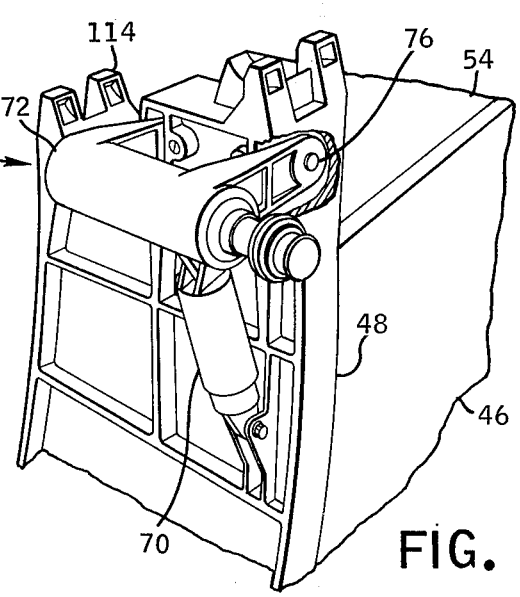
FIG. 4 is a perspective detail view of the forward cradle to cargo bay attachment.

Details of forward attachment fitting 32 are provided in FIG. 4. Fitting 32 consists of a generally cylindrical body 72 hingedly mounted by two legs 74 to frame 48 at hinge points 76 and a liquid spring 70 flexibly mounted to frame 48 and body 72. Liquid spring 70 is a double-acting liquid spring with integral damping which physically controls the maximum cradle displacement in the ± Z direction. The spring preload dictates the onset of motion. Liquid spring 70 stores energy by fluid compression and piston orifices provide energy dissipation. As illustrated in FIGS. 5 a, b and c, double action capability is achieved by mechanical caging. With this arrangement, the internal force due to differential piston area keeps the spring nulled until preload is exceeded.

Preload is achieved by silicone fluid pressurization at assembly.

To minimize spacecraft response, the cradle should ordinarily be as stiff as practical during launch, but must be more flexible and load-absorbing during orbiter landing, expecially during a mission abort landing. The preferred liquid springs provide this dual stiffness feature plus about 25% initial damping. The optimum liquid spring 70 is very stiff until its about 2g preload is reached. At this point, the spring becomes "soft". During liftoff, when Z direction loads at the cradle are less than 2g, the suspension frequency is high and the response low. During landing, when the Z-direction load exceeds 2g, the nonlinear liquid spring becomes effective, reducing the suspension frequency. Of course, the preloads may be adjusted above or below 2g, as desired.

Figure 5A:
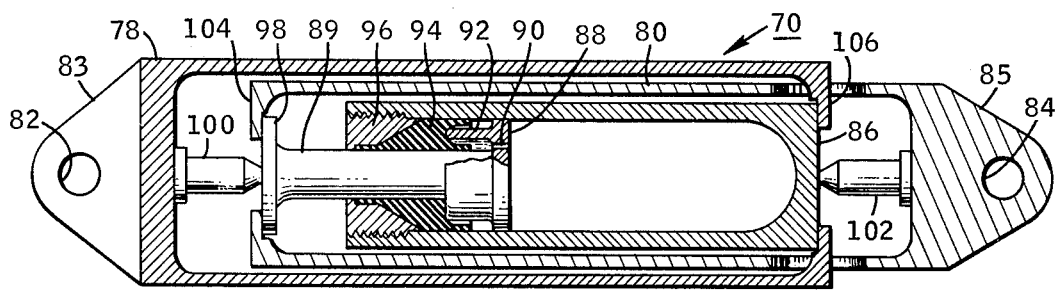
FIGS. 5 a, b and c are schematic axial sections through the forward mount liquid springs illustrating three operating positions.
Figure 5B:
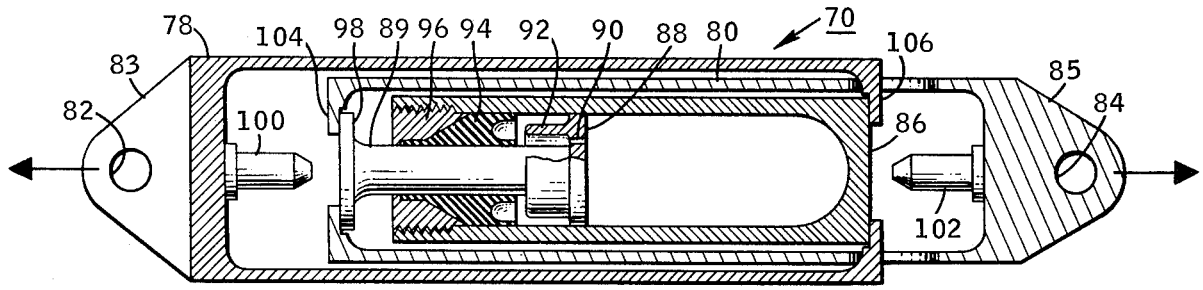
Figure 5C:
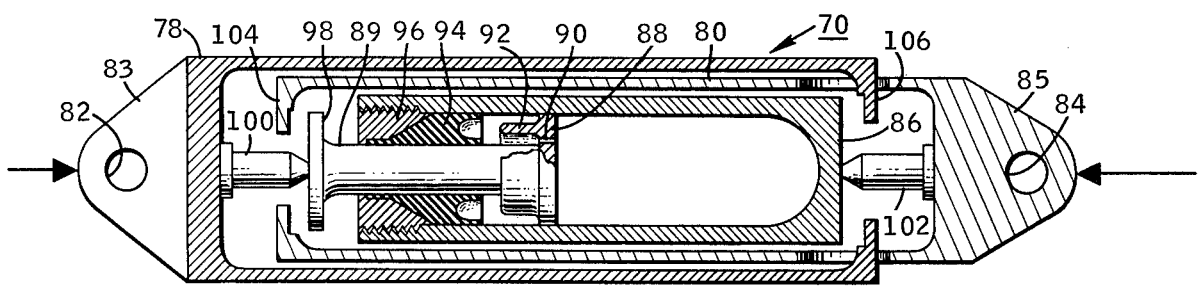

Operation of liquid spring 70 is illustrated in schematic axial section FIG. 5a, b and c. FIG. 5a shows the unit neutral where axial forces are less than the selected preload. FIG. 5b shows the unit extended, with the extending force greater than the selected preload. FIG. 5c shows the unit compressed, with the compressing force greater than the selected preload.

The housing of liquid spring 70 is made up of two telescoping sleeves, an outer sleeve or housing 78 and an inner sleeve or housing 80. Mounting holes 82 and 84 are provided in extended ears 83 and 85 at the ends of housings 78 and 80, respectively.

A fluid chamber 86 within the housing contains fluid under a selected pressure to provide a selected preload. A typical liquid spring, for example, might contain fluid at a pressure of about 7,500 psi to give a preload force of about 20,000 lb. One end of fluid chamber 86 is closed by a damper piston 88 on a shaft 89 having a small orifice 90 therethrough. A skirt 92 on piston 88 contacts a seal 94 when the unit is neutral. A nut 96 threaded into the open end of fluid chamber 86 holds seal 94 in place. A second piston 98 is mounted on shaft 89 opposite damper piston 88. In the neutral position shown in FIG. 5a, piston 98 is at rest in contact with pin 100 on the inner surface of outer housing 78, while fluid chamber 86 is in contact with pin 102 on the inner surface of inner housing 80. An inwardly extending flange 104 at the open end of inner sleeve 80 is also in contact with piston 78, while inwardly extending fingers 106 similarly overlap and contact the end of fluid chamber 86. Thus, the pressure within chamber 86 serves to bias the liquid spring assembly against compression or elongation.

When forces tending to elongate liquid spring 70 exceed the selected preload, the unit is extended and the spring is compressed as seen in FIG. 5b. Fingers 106 press against fluid chamber 86 and flanges 104 press against piston 78 until damping piston 88 moves into the fluid chamber, forcing fluid through orifice 90. Thus, once the preload is overcome the spring is relatively "soft" as determined by the size of orifice 90 and the ratio of piston area on the two sides of piston 88. When the elongating force is released, fluid flows back through orifice 90 and the unit returns to the position in FIG. 5a.

When forces tending to shorten liquid spring 70 are sufficient to overcome the preload, the unit moves to the position shown in FIG. 5c. The unit is compressed and the liquid spring is again compressed. In this case, force is applied by pin 102 on the end of fluid chamber 86 and by pin 100 on the face of piston 78. This forces damper piston 88 further into fluid chamber 86, causing fluid to flow through orifice 90. This compression of the fluid is thus the same for elongation or compression of the unit. Piston 78 and housing 86 are moved out of contact with flange 104 and finger 106, respectively. When the compressive (shortening) forces are released, fluid flows back through orifice 90, returning the unit to the neutral position seen in FIG. 5a.

In this manner, liquid spring 70 acts as a stiff support member up to a selected force threshold and acts as a soft energy absorbing spring beyond that threshold. The double-acting capability of this spring provides equal effect in either the + Z or − Z direction.

The latch for holding the cradle assembly closed during flight and for providing the hoop forces necessary for the spacecraft to cradle support means (as shown in FIGS. 8 and 9) is shown in detail in FIG. 6.

The first clamping latch mechanism 40 includes four outwardly extending hooks 110 which, when the cradle sections are closed, move outwardly and engage eyes 112 in lower latch mount 114 to both prevent movement of second section 22 and to move second section 22 more tightly toward first section 24. As seen in FIG. 2, latches 40 are mounted on beams 54 in line with forward and aft segments 64 and 66, respectively, of the CINCH mount system, so that tightening latches 40 serves to introduce hoop forces, tightening the CINCH mounts, as further described in conjunction with FIGS. 8 and 9, below.

Latch hooks 110 are mounted for rotation about bearings 116 in upper latch mount 118. Latch hooks 110 are rotated by traveling nuts 120 which engage screw 122. Screw 122 has right-hand and left-hand threaded ends, so that traveling nuts 120 move simultaneously toward or away from each other as screw 122 is rotated in one directon or the other. Screw 122 is driven by a conventional gear system within gear box 124, which gear system is driven by a worm gear within housing 126, which is in turn driven by a conventional electric motor (not shown) located behind housing 126 as seen in FIG. 6.

Second clamping latches 42 (as seen in FIG. 2) are identical with latches 40, except that only one set of latch hooks 110 and cooperating eyes 112 are used, since the latches are adjacent to hinges 36.

Details of rollout actuator 38, which moves second cradle section 22 between the closed (flight) and deployed positions are shown in FIG. 7. First brackets 130 secure actuator gear box 132 to beam 54 of first cradle section 24. An electric drive motor 134 drives conventional reduction gears within gear box 132 to drive self-aligning drive splines 136 which connect to second brackets 138. Second brackets 138 are fastened to beam 54 of second cradle section 22. Thus, drive motor 134 rotates brackets between the closed or flight position shown in FIG. 7 and the open or deployed position shown in FIG. 1. Since deployment in space takes place in the absence of gravity, actuator 38 need not be especially powerful. If necessary on earth, ground handling equipment can assist actuator 38 in moving second section 22 between the two positions.

When a spacecraft is supported within cradle 18 for flight, the cradle-to-space vehicle interface consists of a pair of continuous outwardly extending rings around the circumference of the space vehicle which mate with circumferential segments mounted on the inner surface of the cradle. Details of this Continuous Integrated Normal Clamping Hoop (CINCH) system are illustrated in FIGS. 8 and 9. The forward CINCH ring 64 has a concave surface section which mates with a correspondingly shaped convex surface on forward spacecraft interface ring 140. These surfaces allow this attachment to react loads in both the longitudinal (X) and radial (Y,Z) directions. Aft CINCH ring 64 has a generally flat operable area 142 with shoulders 144 adjacent thereto. A corresponding but narrower aft spacecraft interface ring 146 abuts aginst ring 64. This attachment is designed to react only radial (X,Y) loads. CINCH rings 64 and 66 are mounted on frames 48 for maximum strength. Preferably, interface rings 140 and 142 are mounted on frames 148 and 150, respectively of the spececraft, or other sturdy spacecraft elements.

The space vehicle and cradle CINCH rings are engaged and preloaded by operation of cradle latches 40 and 42. Latch preloading forces ensure intimate ring contact while allowing a reasonable (e.g. ± 0.04 inch) diametral manufacturing tolerance between cradle and spacecraft structures.

During deployment, once latches 40 and 42 have been released and actuator 38 has moved second cradle section 22 to the open or deployment position, the space vehicle is moved out of contact with the inner surface of second section 22 to the fully deployed position shown in FIG. 1 by rotation of probe 26. Then, electrical checkout of the space vehicle is performed and the space vehicle is released. The manner of releasing the space vehicle is schematically illustrated in FIGS. 10a, b, c.

As seen in FIG. 10a, probe 26 is mounted on trunnions 160 for rotation between the closed or flight position seen in FIG. 2 and the deployed position in FIG. 1. Probe 26 is rotated by electric drive otor 162 through a conventional gear box 164. Since this rotation takes place in space in the absence of gravity, great strength and power in this mechanism is not required.

Probe 26 mechanically engages a spacecraft 14 by three extended latch pawls 164 which engage a correspondingly shaped latch socket 166 in space vehicle drogue 168. Electrical connection between orbiter and space vehicle is made from electrical harness 171 by probe umbilical connectors 170 mounted on probe umbilical panel 172, which mate with corresponding connectors 174 mounted on drogue 168.

The deployment sequence is schematically illustrated in FIGS. 10a, b and c. Initially, after opening of the orbiter cargo bay doors, opening of the cradle and rotation of probe 26, the space vehicle is positioned as shown in FIG. 1 for the forward space vehicle. After electrical checkout of the space vehicle systems, from the orbiter and/or earth, through electrical harness 171. Then, an inner sleeve 176 within probe housing 178 is extended a distance indicated by arrow 180 by conventional electrical or hydraulic means to separate connectors 170 from connectors 174 and break the orbiter-to-space vehicle electrical connection. Next pawls 164 are retracted out of socket 166 and sleeve 176 is retracted to mechanically separate pawls 164 from socket 166 the distance indicated by arrow 182. The pawl retraction mechanism is conventional, of the sort used in the Apollo system.

Thus, there is provided a system for supporting a space vehicle, such as an upper stage/satellite combination, in a space shuttle orbiter or other space launch vehicle during launch and/or recovery and for deploying or recovering the space vehicle while in earth orbit. The support system substantially reduces launch and landing shocks to the space vehicle.

While certain specific components and arrangements have been described in detail in the above description of a preferred embodiment, these may be varied and other components used, where suitable, with similar results. Various modifications, applications and ramifications of the present invention will occur to those skilled in the art upon reading this disclosure. These are intended to be included within the scope of this invention as defined in the appended claims.

We claim:

1. In a cradle system for supporting a space vehicle in a cargo bay of a reusable launch vehicle during launch and for deploying the space vehicle in outer space through a top bay opening, said cradle having a generally tubular configuration consisting of two longitudinally divided sections, hinged together so that an upper section can be rotated to deploy a space vehicle secured thereto, the lower section being secured to the space launch vehicle said cradle section constructed as closed box structures including inner and outer skins, radial frames and integrally machined edge closing beams; the improvement wherein said lower section is secured to said launch vehicle by six point support system comprising:

two lateral support fittings attached to the lower section at the lower centerline of said lower section, at the forward and aft edges, each lateral support fitting including a downwardly extending tongue fitting within a corresponding socket in the cargo bay surface, whereby loads in the transverse direction are reacted;

two aft attachment fittings located at the aft upper edges of said lower section include outwardly extending pins which engage corresponding sockets in the cargo bay surface, whereby loads in vertical and longitudinal directions are reacted; and two forward attachment fittings located at the upper, forward edge of said lower section including trunnions mounting outwardly extending pins adapted to engage corresponding sockets in the cargo bay surface, said trunnions being hingedly mounted on said lower section for rotation about a line substantially perpendicular to the cradle centerline, said forward attachment fitting further including liquid spring means connected between said trunnions and said lower section to restrain said rotation; whereby loads in the vertical direction are reacted.

2. The improvement according to claim 1 wherein said liquid springs are double-acting liquid springs with integral damping and include means to keep the spring nulled until a selected preload is exceeded, whereby the spring is very stiff when subjected to typical reusable launch vehicle loads but is relatively soft when the preload is exceeded during launch vehicle earth landings.

3. The improvement according to claim 1 wherein said aft attachment fittings are secured to the intersection of the aft cradle frame and the longitudinal closing beam.

4. The improvement according to claim 1 wherein said forward attachment fittings are located at the intersection of the forward cradle frame and the longitudinal closing beam, with said trunnion hinge secured to said forward cradle frame and said liquid spring connected between said trunnion and said forward cradle frame.

* * * * *